Jan. 18, 1944.   G. A. TINNERMAN   2,339,664
FASTENING DEVICE
Filed Aug. 13, 1942   2 Sheets-Sheet 1
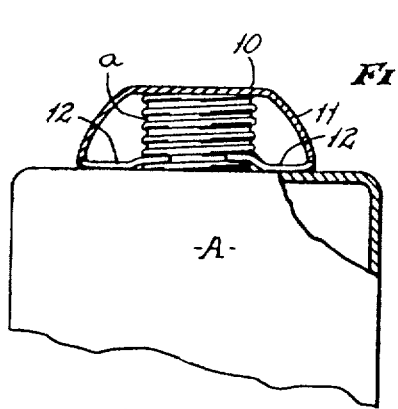
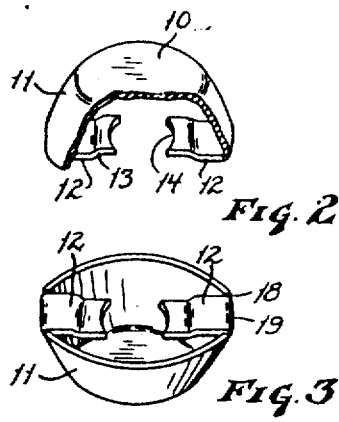
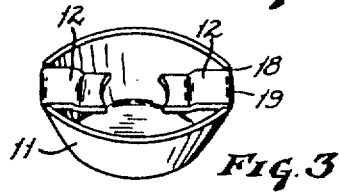
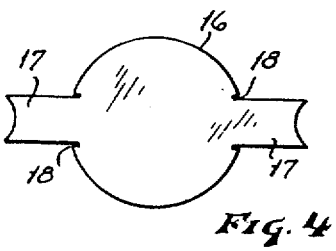
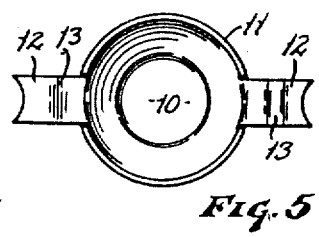
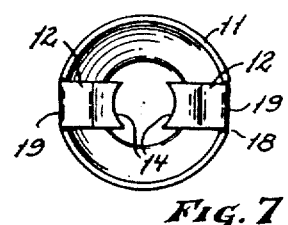
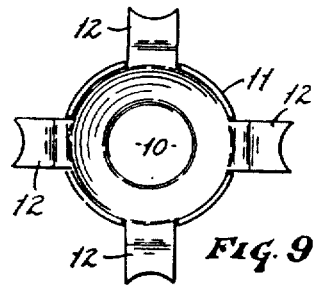
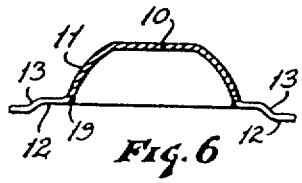
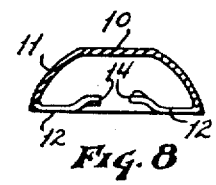
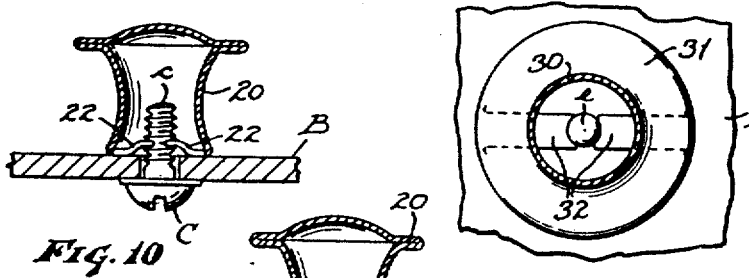
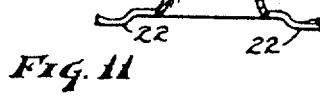
Inventor
GEORGE A. TINNERMAN
By Bates, Teare & McKee
ATTORNEYS.

Jan. 18, 1944. G. A. TINNERMAN 2,339,664
FASTENING DEVICE
Filed Aug. 13, 1942 2 Sheets-Sheet 2

Inventor
GEORGE A. TINNERMAN

By Bates, Teare & McBean
ATTORNEYS.

Patented Jan. 18, 1944

2,339,664

UNITED STATES PATENT OFFICE 2,339,664

FASTENING DEVICE

George A. Tinnerman, Cleveland, Ohio, assignor to Tinnerman Products, Inc., Cleveland, Ohio, a corporation of Ohio Application August 13, 1942, Serial No. 454,677

5 Claims. (Cl. 85—32)

This invention relates to hollow caps provided with means whereby they may be automatically engaged to a stud or screw. The cap itself, may, for instance, constitute a closure for a receptacle having a threaded neck, or it may be a knob, finishing button, cap-nut, or take various other forms, but it is characterized by being formed of a single piece of sheet material. The invention includes both the method of making the cap device from such single piece of material and the article produced.

In producing the article by my method I take a blank of flat sheet material, preferably sheet metal, having comparative stiffness but resilient characteristics, and, by cutting, stamping or pressing operations, I form the body of the cap with two or more laterally extending portions, the extreme ends of the latter being recessed. After the formation with the projecting wings, these wings are bent over inwardly, on their connections with the body as hinges until they extend somewhat crosswise of the body at the bottom thereof and are spaced apart by an opening suitable to receive a stud or bolt. The ends of the inwardly bent wings are formed to bite against such stud or to engage the thread of the bolt. Accordingly, from a single sheet of material I have produced a hollow cap with stud or bolt engaging means integrally carried by it.

Various embodiments of my cap device, made by the method above outlined, are illustrated in the drawings hereof and are hereinafter described in detail.

In the drawings, Fig. 1 is a sectional side elevation of my cap device mounted on the upper portion of a container having a threaded neck; Fig. 2 is a perspective partly broken away of the cap shown in Fig. 1; Fig. 3 is a complete perspective of this cap looking at the bottom thereof; Figs. 4 to 8 illustrate various steps in the manufacture of the cap of Figs. 1, 2 and 3; Fig. 4 being a plan of the cut-out blank, Fig. 5 a plan of the partially formed cap after the pressing operation to form the body; Fig. 6 a cross section of the partially formed cap of Fig. 5; Fig. 7 a bottom view and Fig. 8 a cross section of the finished cap.

Fig. 9 is a bottom view of a modified form of cap partially formed, being in a stage corresponding to Figs. 5 and 6.

Fig. 10 is a section of my cap embodied as a knob, showing the same in place; Fig. 11 is a view of such knob as formed before the wings have been turned in.

Fig. 12 is a sectional elevation of my cap embodied as a finishing button, the view showing the same held in position on a supporting panel; Fig. 13 is a cross section of the latter embodiment, the plane of the section being indicated by the line 13—13 on Fig. 12.

Figure 14:
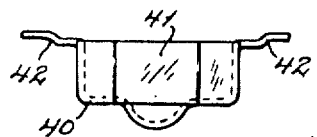
Figure 16:
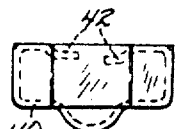
Figure 18:
Figure 17:
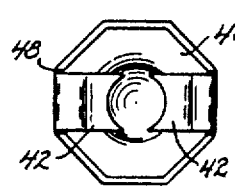
Figure 19:
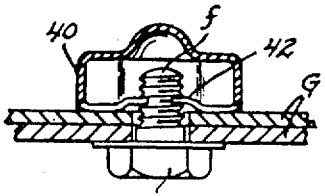

Figs. 14 to 19 inclusive illustrate the invention as embodied in a cap-nut wherein the body of the device has a polygonal form suitable for the application of a wrench; Fig. 14 is a side elevation and Fig. 15 a plan of one of these cap-nut embodiments, showing the device in the stage of manufacture after the body has been formed and while the wings are extended outwardly; Figs. 16 and 17 are respectively a side elevation and a plan showing the same nut completed by bending in the wings; Fig. 18 is a perspective, broken away, showing this nut; Fig. 19 is an axial section showing the nut held in place by a cap screw.

Figure 20:
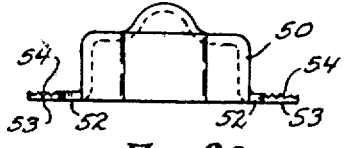
Figure 22:
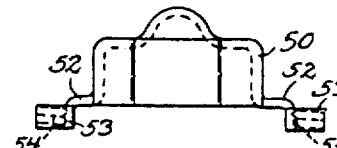
Figure 24:
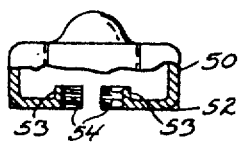
Figure 21:
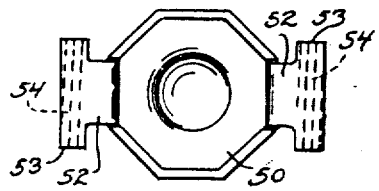
Figure 23:
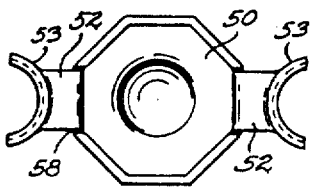
Figure 25:
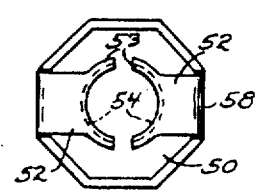
Figure 26:
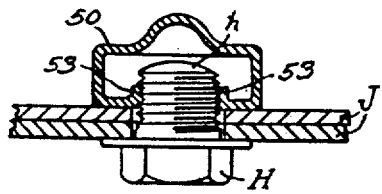

Figs. 20 to 26 illustrate another form of cap-nut made by my method. Fig. 20 is a side elevation and Fig. 21 a bottom plan of such cap nut having extended wings adapted to provide a multiple thread engagement with the bolt when the nut is completed; Figs. 22 and 23 are respectively a side elevation and a bottom plan of this embodiment at a subsequent stage where the thread-engaging portion of the wings has been bent on its connection with the rest of the wings and curved; Figs. 24 and 25 are respectively a side elevation and a bottom plan of this embodiment when completed by the turning in of the wings across the bottom of the nut; Fig. 26 is an axial section showing the nut of Figs. 24 and 25 in place on a bolt passing through two plates.

Figure 27:

Fig. 27 is a sectional side elevation of a modified form of a nut similar to that of Fig. 24, except that the device is shown without screw threads but in condition to receive threads by a tapping operation, the tap being illustrated in this view.

Figure 28:
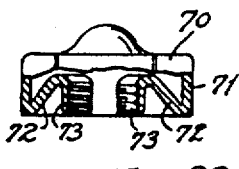
Figure 29:
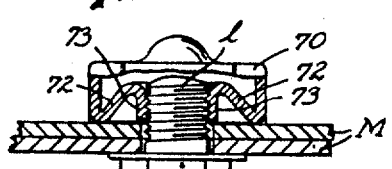

Fig. 28 is a sectional side elevation of a modified form of cap nut made by my forming and bending operations but with the thread-carrying member differently carried from that heretofore described; and Fig. 29 is an axial section of the cap nut of Fig. 28 in place on a cap screw holding together two plates.

I will first describe the embodiment illustrated in Figs. 1 to 8. In Figs. 1 and 2, I have shown a cap of inverted bowl-like form having a flat top portion 10 and a depending wall 11 which may be a segment of a sphere and a pair of bottom tongues 12 which are carried by diametrically opposed portions of the wall adjacent the lower edge and extend inwardly. These tongues are bent upwardly in an inclined direction at 13 and finally terminate in concave edges 14.

The edges of the two opposed tongues bound a circular opening and these edges are slightly twisted in opposite directions or warped so that the two opposed edges define a turn of a helix.

The simple device described provides in effect a threaded cap. Fig. 1 illustrates such a cap mounted on the threaded neck $a$ of a container A. The warped edges of the tongues 12 act as a screw thread coacting with the helical thread on a neck $a$, so that the cap is turned down by rotation into the position shown in Fig. 1. In this view the lower edge of the cap is shown as directly abutting the flat top of the container A. It is to be understood, however, that if desired an annular gasket may be placed about the neck engaged by the lower edge of the cap, also a gasket beneath the flat top of the cap to engage the upper end of the neck of the container.

In the manufacture of the cap described, I take a comparatively thin flat sheet of metal or other material having sufficient rigidity but spring characteristics and I cut out a blank of approximately the form shown in Fig. 4, having a disc-like portion 16, and two opposed diametrically opposite wing portions 17 concave at their ends, there being four slight indentations 18 where the wings leave the disc. The second operation is to place the blank described between the male and female dies, which press the disc 16 into the bowl form 11, 10, heretofore described, and press the wings 17 so that they become the offset tongues 12, 13 heretofore described. The result of this operation is illustrated in Figs. 5 and 6.

The projecting offset tongues are now bent on their junctions 19 with the bowl of the cap until they project inwardly. Either at this operation or the preceding operation, the edges of the tongues are warped so that when the final article is produced, as shown in Figs. 7 and 8, the extreme edges 14 of the tongues define a helical turn.

It will be noticed particularly from Figs. 3 and 8 that, by reason of the notches 18 originally formed in the blank, the bent in tongues, where they leave the bowl, have their under faces in the same plane as the circular bottom edge of the bowl, and thus the cap has a substantially continuous annular surface at its lower edge which may engage any plane surface with which the cap cooperates, as, for example, the flat top of the container in Fig. 1.

In Fig. 9, I have illustrated a cap made as heretofore explained, except that in this case I have provided four tongues 12 arranged 90° apart angularly. This figure corresponds in stage of operation to Fig. 5. When the four tongues are bent inwardly, a cap is produced like Fig. 2, except that there are four tongues, the concave and warped ends of which bound one or more helical threads.

Another embodiment of a cap member made by my invention is illustrated in Figs. 10 and 11 as a round hollow knob 20 formed first with a pair of oppositely extending tongues 22. After the formation of the knob, preferably by several stamping and drawing operations to produce the partially completed article of Fig. 11, the tongues 22 formed as heretofore described are turned inwardly to provide the thread-engaging members of the knob. These operations of bending in the bottom tongues correspond with those described with reference to Figs. 5 to 8.

Fig. 10 illustrates the knob 20 mounted on a suitable panel B by means of a screw C. The screw is shown as having its head below the panel and the threaded shank $c$ passing through an opening in the panel and receiving the nut provided by the warped oblique tongues 22.

Figs. 12 and 13 illustrate my invention in the production of a finishing button. In this case, I form by a suitable stamping operation or operations a dome 30 with an extended annular flange 31 and two diametrically opposed tongues 32. These tongues originally extend outwardly from the edge of the flange 31 but are bent inwardly into underlying contact with that flange. They are formed at their ends to engage the fastening member to which the button is applied.

The operations of making the finishing button are similar to those performed in making the cap and the knob already described; however, if the finishing button is not to have a screw thread but merely tongues which may bite against the edge of a stud over which the button is shoved, it is not necessary to warp the edges of the tongues to bound a helical thread.

This is the construction illustrated in Fig. 12 where D indicates a panel and E a stud having a head engaging the underside of the panel and a smooth shank $e$ extending through an opening in the panel and into the dome of the finishing button. Such shank is readily engaged by the tongues if the button is shoved by straight movement parallel with the axis of the shank into the position shown in Fig. 12, whereupon the tongues would be slightly sprung apart by the shank (which was greater in diameter than the original opening between the tongues) and thus the tongues will have spring biting action on the shank to hold the button in place.

In Figs. 14 to 19 inclusive, I have illustrated a polygonal cap nut made by my method. In these views 40 indicates the top portion of the nut, shown as centrally domed, and 41 indicates the wall thereof, which is a polygon (shown as an octagon), having diametrically opposite sides parallel with each other. Extending from two opposite sides are tongues 42, the extreme ends of which are concave and warped to present a turn of a helix to engage a bolt thread.

Figure 15:
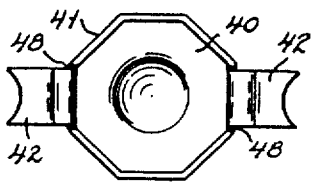

Figs. 14 and 15 illustrate the first stage of this embodiment after the formation of the blank. In this stage, the body of the nut has been pressed into a cup-like form shown and the two wings 42 extended outwardly.

Figs. 16 and 17 illustrate this nut in finished condition, after the tongues have been bent inwardly by a turn of approximately 180° on their junctions with the nut sides as hinges. In the formation of the blank the notches 48 were left on the opposite sides of the wings which were to become inward tongues so that in the finished nut the lower face of these tongues is in the same plane with the bottom of the nut as shown particularly in Fig. 16.

Fig. 19 illustrates the cup nut above described in use. Here a bolt F is shown with its thread shank $f$ passing through two plates G to be secured together. The application of wrenches to the exterior of the hollow nut and to the head of the bolt causes the nut to be screwed tight againsht the adjacent plate G and thus clamp the two plates together between the nut and bolt head.

In the modification shown in Figs. 20 to 25, the body of the nut 50 is formed as heretofore described, but the outwardly extending wings 52 are different. Each wing 52 is provided with a T-head 53, the upper face of which is diagonally grooved, as shown at 54. These grooves are of V-formation in cross section and the incline thereof corresponds to the pitch of the thread of the bolt with which the nut is to be used. The grooves may be made in the wings by a pressing operation at the same time that the body of the cap is pressed from the sheet metal, or they may be formed as subsequent operation by pressing or cutting the flat wing illustrated in Figs. 20 and 21.

After the body is formed with the extended and grooved wings, the grooved T-heads 53 of the wings are bent at right angles to the attached portion 52 of the wings, as shown in Fig. 22. This puts the inclined grooving 54 on the outer vertical sides of the T-heads. These T-heads are then curved to a concavo-convex form with the concavity outward as shown in Fig. 23.

Now the wings 52 are bent over on their junction 58 with the body as a hinge until these wings extend inwardly and are aligned with each other at the bottom of the nut, as shown in Fig. 24. This brings the grooved T-heads 53 into vertical position opposite each other, where their grooves form an interrupted helical thread of several turns for the reception of the bolt.

Fig. 26 illustrates the mounted nut formed by the successive operations indicated in Figs. 20 to 25. In Fig. 26 H indicates a cap screw having a threaded shank h and the nut 50 is screwed onto this shank to clamp between it and the head of the bolt the plates J.

In place of forming the threads by grooving the T-heads on the extended wings when the nut body is formed, I may leave these wings blank and tap the thread after the nut is otherwise formed. This is illustrated in Fig. 27 where the nut 60 has inturned wings 62 carrying arcuate T-heads 63 which are blank. K indicates a usual screw tap shown as aligned with the axis of the nut and in position to tap a thread in the opposed arcuate T-heads 63.

In Figs. 28 and 29, I have shown another modified form of cap nut made by this invention. Here the cap 70 has the polygonal wall 71 as heretofore described, but the wings 72 instead of extending inwardly horizontally at the bottom of the nut extend inwardly in an upwardly inclined direction and the grooved arcuate T-heads on such wings 73 (individually similar to the arcuate grooved heads 53) extend downwardly from the upper ends of the portion 72 instead of upwardly as in Fig. 24.

Fig. 29 illustrates the nut 70 in use. Here the threaded T-heads 73 engage the shank I of the cap screw L and operate to clamp the pair of plates M between the head of the bolt and nut.

It will be seen from the various embodiments of the invention illustrated in the different views that my invention has a wide extent of adaptation. Notwithstanding the difference in the specific forms shown they are all characterized by a cap device being made of a single piece of sheet material, deformed to produce the body of the device and outwardly extending opposed wings, which are thereafter bent in on their connections with the body as hinges into the body adjacent its free edge. These operations of cutting, stamping, and bending, are well known and readily performed, so that my cap device may be produced by this method with great rapidity and at comparatively small expense.

I claim:

1. A cap device comprising a bowl-like portion having a top and a continuous wall, a pair of tongues integral with the wall extending inwardly directly therefrom, the under face of the tongues being substantially in the same plane as the bottom of the wall where the tongues join the wall, the tongues being then bent upwardly and having their free edges concaved and grooved to define a helical turn.

2. A cap-nut comprising a hollow body open at one end and having a polygonal wall, wings integral with the body and joining flat faces of the wall, said wings extending inwardly, each wing having a curved extension projecting at an angle to the connecting portion of the wing, said extensions extending longitudinally about the axis of the nut and being threaded on their inner periphery.

3. A cap-nut comprising a hollow body having a polygonal wall, a pair of wings extending inwardly from opposite flat surfaces of the wall at the lower ends thereof, the bottoms of said wings being substantially in the same plane as the bottom of the rest of the wall, curved extensions at the inner ends of said wings projecting upwardly therefrom into the interior of the cap, the inner faces of said extensions defining a substantially cylindrical space, such spaces being grooved by a groove constituting an interrupted helix whereby the nut may be mounted on a threaded bolt.

4. A cap-nut comprising a hollow body having a polygonal wall, wings secured at their lower ends to flat faces of the wall adjacent the free edge thereof, said wings extending at an acute angle upwardly within the cap, the wings having downward extensions from their upper ends within the cap at an acute angle to the connected portion of the wings, said downward extensions being curved and grooved on their adjoining faces to provide a helical thread.

5. A cap nut comprising a hollow continuous bowl-like body having a top and a polygonal wall with flat sides opposite each other, suitable for the application of a wrench, a pair of tongues made by bending inwardly extensions of opposite flat sides respectively, said tongues having their free end portions projecting longitudinally within the body and ribs in the inner faces of such longitudinally projecting portions formed to define a helix to engage a screw thread.

GEORGE A. TINNERMAN.